(12) United States Patent
Blaufelder et al.

(10) Patent No.: US 11,237,097 B2
(45) Date of Patent: Feb. 1, 2022

(54) AIR CONDITIONING METHOD AND DEVICE

(71) Applicant: WEISS UMWELTTECHNIK GMBH, Reiskirchen (DE)

(72) Inventors: David Blaufelder, Giessen (DE); Bjoern Stroh, Gemuenden (DE); Karim Werner, Linden (DE); Yannik Zahrt, Rabenau (DE); Volker Schlosser, Gruenberg (DE); Christian Haack, Marburg (DE)

(73) Assignee: WEISS TECHNIK GMBH, Reiskirchen (DE)

( * ) Notice: Subject to any disclaimer, the term of this patent is extended or adjusted under 35 U.S.C. 154(b) by 0 days.

(21) Appl. No.: 16/646,923

(22) PCT Filed: Aug. 14, 2018

(86) PCT No.: PCT/EP2018/072052
§ 371 (c)(1),
(2) Date: Mar. 12, 2020

(87) PCT Pub. No.: WO2019/052761
PCT Pub. Date: Mar. 21, 2019

(65) Prior Publication Data
US 2020/0264091 A1   Aug. 20, 2020

(30) Foreign Application Priority Data
Sep. 14, 2017 (DE) ..................... 10 2017 216 361.5

(51) Int. Cl.
*G01N 17/00* (2006.01)
*B01L 1/02* (2006.01)
(Continued)

(52) U.S. Cl.
CPC ............ *G01N 17/002* (2013.01); *B01L 1/025* (2013.01); *B01L 7/50* (2013.01); *F25B 9/006* (2013.01);
(Continued)

(58) Field of Classification Search
CPC ................. G01N 17/002; B01L 11/025; B01L 2300/1894; F25B 9/006; F25B 40/02;
(Continued)

(56) References Cited

U.S. PATENT DOCUMENTS 3,487,653 A * 1/1970 Myre ...................... F25B 9/006
62/76
4,381,549 A * 4/1983 Stamp, Jr. ........... F24D 19/1039
62/126
(Continued)

FOREIGN PATENT DOCUMENTS

CN   101914368 A   12/2010
CN   102971394 A   3/2013
(Continued)

OTHER PUBLICATIONS

PCT International Search Report and Written Opinion, PCT/EP2018/072052, dated Nov. 16, 2018, 22 pages.
(Continued)

*Primary Examiner* — Kun Kai Ma
(74) *Attorney, Agent, or Firm* — Quarles & Brady LLP

(57) ABSTRACT

A method for conditioning air in a test space of a test chamber which receives test material. A temperature in a range of −20° C. to +180° C. is established within the test space with a cooling device. The cooling device includes a cooling circuit with a refrigerant, a heat exchanger, a compressor, a condenser and an expansion element. An internal heat exchanger of the cooling circuit is connected to a high-pressure side of the cooling circuit upstream of the
(Continued)

expansion element and downstream of the condenser and to a low-pressure side of the cooling circuit upstream of the compressor and downstream of the heat exchanger and is used to cool the refrigerant of the high-pressure side. A zeotropic refrigerant is used and the internal heat exchanger is used to cool the refrigerant of the high-pressure side to lower an evaporation temperature at the expansion element.

19 Claims, 4 Drawing Sheets

(51) Int. Cl.
    *B01L 7/00* (2006.01)
    *F25B 9/00* (2006.01)
    *F25B 40/02* (2006.01)

(52) U.S. Cl.
    CPC ....... *F25B 40/02* (2013.01); *B01L 2300/1894* (2013.01); *F25B 2400/0401* (2013.01); *F25B 2600/0261* (2013.01); *F25B 2600/21* (2013.01)

(58) Field of Classification Search
    CPC ...... F25B 2400/0401; F25B 2600/0261; F25B 2600/21; F25B 41/20; F25B 2400/04; F25B 40/00
    See application file for complete search history.

(56) References Cited

U.S. PATENT DOCUMENTS

| | | | |
|---|---|---|---|
| 5,724,832 A * | 3/1998 | Little | B01D 8/00 62/114 |
| 6,131,401 A | 10/2000 | Ueno et al. | |
| 6,176,102 B1 | 1/2001 | Novak et al. | |
| 6,826,918 B1 | 12/2004 | Taras et al. | |
| 6,919,061 B1 * | 7/2005 | Sherman | C01B 3/08 423/421 |
| 2004/0200233 A1 | 10/2004 | Funakoshi et al. | |
| 2005/0066678 A1 | 3/2005 | Kamimura | |
| 2005/0253107 A1 | 11/2005 | Flynn et al. | |
| 2006/0218965 A1 | 10/2006 | Manole | |
| 2015/0153076 A1 | 6/2015 | Sugimoto et al. | |
| 2017/0082333 A1 * | 3/2017 | Shimazu | F25B 31/004 |
| 2018/0120003 A1 * | 5/2018 | Haack | F25B 21/02 |
| 2018/0320933 A1 * | 11/2018 | Haack | F25B 41/31 |
| 2019/0093926 A1 * | 3/2019 | Haack | C09K 5/041 |
| 2019/0383524 A1 * | 12/2019 | Haack | F25B 7/00 |
| 2019/0383713 A1 * | 12/2019 | Haack | F25B 5/02 |
| 2020/0263911 A1 * | 8/2020 | Haack | F25B 7/00 |
| 2020/0264091 A1 * | 8/2020 | Blaufelder | B01L 1/025 |
| 2021/0040366 A1 * | 2/2021 | Goepfert | C09K 5/045 |

FOREIGN PATENT DOCUMENTS

| | | |
|---|---|---|
| CN | 204234107 U | 4/2015 |
| CN | 105466061 A | 4/2016 |
| DE | 19654790 C1 | 7/1998 |
| DE | 69822748 T2 | 8/2004 |
| EP | 0344397 A2 | 12/1989 |
| EP | 0801278 A2 | 10/1997 |
| EP | 3051227 A1 | 8/2016 |
| WO | 2016181957 A1 | 11/2016 |

OTHER PUBLICATIONS

Breidenbach, Der Kalteanlagenbauer, Grundlagen der Kalteanwendung, Copyright 2014 VDE Verlag GmbH, 22 pages [Table of Contents, pp. 71, 290, 292, 478, 479, 625] [English translation is not available].

China National Intellectual Property Administration, First Office Action and Search Report, Application No. 201880059347, dated Apr. 16, 2021, 9 pages [English Language Translation Only}.

* cited by examiner

AIR CONDITIONING METHOD AND DEVICE

CROSS-REFERENCE TO RELATED APPLICATIONS

This application represents the national stage entry of PCT International Patent Application No. PCT/EP2018/072052 filed Aug. 14, 2018, which claims priority to German Patent Application No. DE 10 2017 216 361.5 filed Sep. 14, 2017. The contents of these applications are hereby incorporated by reference as if set forth in their entirety herein.

The disclosure relates to a method for conditioning air in a test space of a test chamber which serves to receive test material and which can be sealed against an environment and is temperature-insulated, and to a test chamber, a temperature in a temperature range of at least −20° C. to +180° C. being established within the test space by means of a cooling device of a temperature control device of the test chamber, the cooling device comprising a cooling circuit with a refrigerant, a heat exchanger, a compressor, a condenser and an expansion element, an internal heat exchanger of the cooling circuit connected to a high-pressure side of the cooling circuit upstream of the expansion element and downstream of the condenser and to a low-pressure side of the cooling circuit upstream of the compressor and downstream of the heat exchanger being used to cool the refrigerant of the high-pressure side.

Methods and test chambers of this kind are typically used to test physical and/or chemical properties of objects, in particular of devices. For instance, temperature test chambers or climate test chambers in which temperatures in a range of −50° C. to +80° C. can be set are known. In climate test chambers, desired climatic conditions can additionally be set, to which the device or the test material is then exposed for a defined period of time. Test chambers of this kind are often or sometimes realized as mobile devices which are merely connected to a building via required supply lines and comprise all modules needed to control the temperature and climate. The temperature of a test space holding the material to be tested is typically controlled in a circulating air duct within the test space. The circulating air duct forms an air treatment space in the test space, in which heat exchangers for heating or cooling the air flowing through the circulating air duct and the test space are disposed. A fan or ventilator aspirates the air located in the test space and directs it to the respective heat exchangers in the circulating air duct. In this way, the test material can be temperature-controlled or exposed to a defined temperature change. During a test interval, a temperature can repeatedly change between a maximum temperature and a minimum temperature of the test chamber. A test chamber of this kind is known from EP 0 344 397 A2, for example.

Furthermore, it is also known for an internal heat exchanger to be connected to a high-pressure side of the cooling circuit downstream of a condenser and upstream of an expansion element to cool a liquefied refrigerant. The internal heat exchanger may also be cooled via a bypass having another expansion valve. The thus-realized additional internal cooling of the cooling circuit typically serves to improve efficiency or increase performance of the cooling circuit. For example, a suction pressure of the compressor or a pressure difference between the high-pressure side and the low-pressure side can be reduced in that case while an evaporation temperature of the refrigerant at the expansion element stays the same, which saves energy.

The refrigerant circulating in a cooling circuit must be of such a nature that it can be used in the cooling circuit within the aforementioned temperature difference. In particular, a dew point temperature of the refrigerant cannot be higher than a minimum temperature of the temperature range of the cooling circuit that is to be achieved because the minimum temperature would not be achievable otherwise when the refrigerant is evaporated in the heat exchanger serving to cool the test space. The dew point temperature of azeotropic refrigerants is reached immediately behind the expansion element in the heat exchanger. Straight cooling circuits for test spaces require a very high spatial temperature stability to precisely control the temperature of the test chamber, which cannot be achieved at all or only to a limited degree using zeotropic refrigerants. High temperature stability cannot be achieved in this case because the dew point temperature or a dew point of the zeotropic refrigerant may locally shift as a function of a temperature in the test space in the area of the heat exchanger in the test space because of temperature differences. Hence, a use of zeotropic refrigerants, i.e., of refrigerants having a temperature glide, in cooling circuits of test chambers is avoided.

Furthermore, cooling devices in which a zeotropic refrigerant mixture is successively evaporated are known. This means that components of the refrigerant are evaporated one after the other by means of an expansion element. Cooling devices of this kind are also referred to as mixed fluid cascade systems and are suitable for realizing a substantially static cryogenic temperature; dynamic temperature changes cannot be realized.

Also, the refrigerant must be of such a nature that it can be used in the cooling circuit within the aforementioned temperature difference. As per statutory regulations, the refrigerant must not contribute to the depletion of ozone in the atmosphere and must not significantly contribute to global warming. This means that essentially no fluorinated or chlorinated substances can be used as refrigerants, which is why natural refrigerants or gasses are an option. Moreover, the refrigerant should be nonflammable in order to not complicate filling, shipping and operation of the test chamber because of any safety regulations that may have to be observed. Also, production of a cooling circuit becomes more expensive if a flammable refrigerant is used because of the constructional measures required in that case. Flammability refers to the refrigerant's property of reacting to ambient oxygen by releasing heat. A refrigerant is flammable in particular if it is classified in fire class C of European standard EN2 and DIN 378 classes A2, A2L and A3.

Moreover, a refrigerant should have a relatively low $CO_2$ equivalent; i.e., a relative global warming potential (GWP) should be as low as possible in order to avoid indirect damage to the environment in case the refrigerant is released. The GWP indicates how much a defined mass of a greenhouse gas contributes to global warming, carbon dioxide serving as the reference value. The value describes the mean warming effect over a specific period, 20 years being set here for the sake of comparability. For a definition of the relative $CO_2$ equivalent or GWP, reference is made to Intergovernmental Panel on Climate Change (IPCC), Assessment Report, Appendix 8.A, Table 8.A.1.

Refrigerants with a low GWP, such as <2500, have the disadvantage that these refrigerants tend to have a significantly lower cold capacity in the temperature ranges relevant for a test chamber than refrigerants with a comparatively higher GWP. A lower GWP can be achieved with refrigerant mixtures that have a comparatively high mass fraction of carbon dioxide; however, these refrigerant mixtures may have zeotropic properties due to the different substances mixed, which is undesirable in test chambers.

Therefore, the object of the present disclosure is to propose a method for conditioning air in a test space of a test chamber and a test chamber by means of which temperatures of up to at least −20° C. can be achieved at high temperature stability using an environmentally friendly refrigerant.

This object is attained by a method having the features of claim 1 and by a test chamber having the features of claim 14.

In the method according to the disclosure for conditioning air in a test space of a test chamber which serves to receive test material and which can be sealed against an environment and is temperature-insulated, a cooling device of a temperature control device of the test chamber comprising a cooling circuit with a refrigerant, a heat exchanger, a compressor, a condenser and an expansion element is used to establish a temperature in a temperature range of at least −20° C. to +180° C. within the test space, an internal heat exchanger of the cooling circuit connected to a high-pressure side of the cooling circuit upstream of the expansion element and downstream of the condenser and to a low-pressure side of the cooling circuit upstream of the compressor and downstream of the heat exchanger is used to cool the refrigerant of the high-pressure side, wherein a zeotropic refrigerant is used as the refrigerant, cooling of the refrigerant of the high-pressure side by means of the internal heat exchanger being used to lower an evaporation temperature at the expansion element.

Thus, in the method according to the disclosure, the evaporation temperature of the refrigerant cooled by means of the internal heat exchanger is reduced at the expansion element relative to an evaporation temperature of an uncooled refrigerant. The cold capacity transferred from the low-pressure side to the high-pressure side via the internal heat exchanger is thus used at least in part, preferably exclusively, to reduce the evaporation temperature of the refrigerant at the expansion element. Furthermore, use of a zeotropic refrigerant having a temperature glide is made possible in the first place because the location of the dew point temperature of the refrigerant or the dew point of the refrigerant can be shifted into the internal heat exchanger in this case. As a consequence of the temperature glide of the zeotropic refrigerant, the achieved dew point temperature of the refrigerant may be comparatively high and thus prevent the heat exchanger from cooling further. Hence, according to the disclosure, only part of the refrigerant is evaporated in the heat exchanger and the unusable part of the wet vapor portion of the refrigerant is shifted into the internal heat exchanger. On the whole, this allows refrigerants which contain a mass fraction of $CO_2$ and which, while being environmentally friendly, have zeotropic properties to be used to establish low temperatures in a test space. Moreover, by shifting part of the temperature glide or part of the wet vapor of the refrigerant from the heat exchanger in the test space into the internal heat exchanger, a comparatively improved temperature stability can be achieved with the zeotropic refrigerant. A cold capacity output via the heat exchanger is generated in a section of the temperature glide only, which means that a shift of the dew point of the refrigerant in the cooling circuit has hardly any impact on a temperature stability of the heat exchanger. Another substantial aspect of the disclosure is that a single heat exchanger is provided for cooling a fluid, i.e., the air in the test space, in this case.

During lowering of the evaporation temperature of the refrigerant of the high-pressure side, a suction pressure of the refrigerant of the low-pressure side can be kept constant. A greater system complexity, such as in the form of additional control of the suction pressure and control of the expansion element as a function of the suction pressure, is not necessarily required in that case. In particular, the compressor may also be operated at constant output irrespective of an operating state of the cooling circuit. When piston pumps are used as compressors in particular, it is essential for them to be in operation for long periods of time and at a constant speed in order to achieve a long service live.

The refrigerant can evaporate at constant suction pressure on an evaporation section of the cooling circuit from the expansion element up to and including the internal heat exchanger. If the suction pressure or evaporation pressure of the refrigerant is constant, the refrigerant can evaporate from the expansion element at a low evaporation temperature to the internal heat exchanger at a high evaporation temperature according to the temperature glide of the refrigerant. The dew point temperature resulting from the temperature glide may be higher than the temperature of the fluid to be cooled or of the air in the test space. Once an evaporation temperature of the refrigerant is equal to the temperature of the air to be cooled in the test space at the same suction pressure, the air cannot be cooled any further. However, the dew point temperature reached in the other heat exchanger is lower than the liquid temperature of the refrigerant on the high-pressure side of the internal heat exchanger, which means that a liquid temperature of the refrigerant can be reduced further. Accordingly, an evaporation temperature downstream of the expansion element can be lowered without changing the suction pressure, allowing further cooling of the air in the test space to be achieved. In principle, the suction pressure can be varied by varying an amount of refrigerant injected, i.e. an amount of refrigerant routed via the expansion element, should this be required to adjust performance.

Thus, a first portion of the refrigerant routed via the expansion element can be evaporated in the heat exchanger and a second portion of the refrigerant can be evaporated in the internal heat exchanger. An evaporation section of the cooling circuit within which the refrigerant evaporates may extend from the expansion element as far as to the internal heat exchanger. The evaporation section may run through the internal heat exchanger, in which case a dew point of the refrigerant may be located at an exit of the internal heat exchanger upstream of the compressor. A first portion/second portion ratio may change during operation of the cooling circuit as a function of a temperature in the test space or at the heat exchanger. For example, a comparatively large temperature difference between the temperature of the heat exchanger and a temperature in the test space may lead to accelerated heating of the refrigerant in the heat exchanger, which results in a shift of the dew point of the refrigerant toward an entry of the internal heat exchanger or an exit of the heat exchanger upstream of the compressor. This kind of shift of the dew point can be tolerated as long as no comparatively low temperature or target temperature has been established in the test space yet. When the temperature of the heat exchanger approaches the temperature in the test space, the dew point shifts and the second portion thus grows relative to the first portion of the refrigerant.

The evaporation temperature of the refrigerant of the high-pressure side can be lowered in a self-controlled manner. Depending on the temperature at the heat exchanger, refrigerant no longer evaporating can be discharged from the heat exchanger in the flow direction because the temperature at the heat exchanger is no longer sufficient to cause a phase transition of the refrigerant in this case. Thus, wet vapor or liquid refrigerant is re-evaporated in the internal heat exchanger because here a temperature difference between the high-pressure side and the low-pressure side can always be greater than at the heat exchanger. If a temperature of the liquid refrigerant upstream of the expansion element is reduced by means of the internal heat exchanger by the heat exchange at the internal heat exchanger, the energy density of the refrigerant upstream of the expansion element and the temperature difference thus achievable at the heat exchanger increase. The interaction of the expansion element, the heat exchanger and the internal heat exchanger does not have to be controlled, in principle.

The temperature control device can be used to reduce a temperature of $>+60°$ C. to $+180°$ C. to a temperature of $\leq -20°$ C. in the test space. In that case, the refrigerant is strongly heated in the heat exchanger by the comparatively high temperature in the test space, which is why the cooling circuit may be technically adjusted to a refrigerant heated in that temperature range in terms of its construction at least on the low-pressure side of the cooling circuit. Otherwise, a refrigerant heated in that manner is not ideally usable any more on the high-pressure side of the cooling circuit. Still, the refrigerant can also be used to establish a temperature of $\leq -20°$ C. in the test space.

The temperature control device can be used to establish a temperature in a temperature range of $-57°$ C. to $+180°$ C., preferably $-80°$ C. to $+180°$ C., particularly preferably $-100°$ C. to $+180°$ C., within the test space. Unlike in a mixed fluid cascade system, the refrigerant with all components contained in the refrigerant can be evaporated at once by means of the expansion element. Since a freezing point of the $CO_2$ is $-56.6°$ C., refrigerant mixtures that contain a large mass fraction of $CO_2$ are no longer suitable for achieving temperatures below $-56.6°$ C., on principle. It is the use of the internal heat exchanger and its cooling of the liquefied refrigerant of the high-pressure side that allow temperatures below $-56.6°$ C. to be reached using refrigerants of this kind.

Furthermore, a refrigerant having a temperature glide of $\geq 5$ K, preferably $\geq 10$ K, particularly preferably $\geq 20$ K may be used. A temperature glide of the refrigerant should not be $>30$ K so that a cooling device can be operated in a reasonable way.

The refrigerant can be evaporated at a suction pressure or evaporation pressure in a pressure range of 0.3 to 5 bar absolute. Use of the refrigerant within that pressure range allows cost-effective production of the cooling circuit because no special pressure-resistant modules and components have to be used to construct the low-pressure side of the cooling circuit.

Also, the refrigerant can be condensed at a condensation pressure in a pressure range of 5 to 35 bar absolute. Here, too, the high-pressure side can be constructed using modules and components that do not have to be adapted to comparatively higher pressures.

The refrigerant may be a nonflammable refrigerant having a relative $CO_2$ equivalent of <2500, preferably <500, particularly preferably <100, over 20 years. Consequently, the refrigerant may be of little harm to the environment. If the refrigerant is nonflammable, the test chamber and the cooling circuit in particular can be designed more cost-efficiently because no special safety measures in terms of flammability of the refrigerant will have to be observed. In this case, the refrigerant may at least not be classified in fire class C and/or refrigerant safety group A1. Moreover, shipping and transport of the test chamber is easier because the test chamber can be filled with the refrigerant before being transported, irrespective of the mode of transport. If a flammable refrigerant is used, filling may not be possible until start-up at the installation site. Furthermore, use of the nonflammable refrigerant in the presence of ignition sources in the test space is possible. In that case, sensors for detecting a combustible atmosphere in the area of the heat exchanger in the test space are not required.

A refrigerant mixture composed of a mass fraction of carbon dioxide ($CO_2$) of 30 to 50 mass percent and a mass fraction of at least one other component may be used as the refrigerant, the other component being pentafluoroethane ($C_2HF_5$) and/or difluoromethane ($CH_2F_2$). A refrigerant mixture of this kind composed of carbon dioxide and one or more fluorinated refrigerants can have a low GWP and can be nonflammable or flammable to a limited degree only. A fraction of carbon dioxide has to be as low as possible because otherwise a freezing point of the refrigerant mixture would rise with an increasing mass fraction of carbon dioxide. However, a lower mass fraction of carbon dioxide reduces a GWP-reducing effect of the carbon dioxide. This is why partly fluorinated refrigerants have a significantly higher GWP than carbon dioxide, while also having an improved flame-retardant effect. Pentafluoroethane and difluoromethane in particular contain significant amounts of fluorine atoms, which leads to an undesirably high GWP. As was surprisingly found, however, a sufficiently low GWP, i.e., <150, for example, can be achieved with a refrigerant mixture containing a mass fraction of carbon dioxide of 30 to 40 mass percent with pentafluoroethane and/or difluoromethane. As was also found, a flame-retardant effect of pentafluoroethane is comparatively greater than that of carbon dioxide. Moreover, the negative properties of pentafluoroethane and of carbon dioxide can be reduced by adding difluoromethane as a third component of the refrigerant mixture. Thus, a refrigerant mixture containing pentafluoroethane and difluoromethane can be classified as nonflammable. At the same time, difluoromethane has a lower freezing temperature with carbon dioxide than with pentafluoroethane. Consequently, a mixture of pentafluoroethane, difluoromethane and carbon dioxide can achieve a lower freezing temperature than pentafluoroethane and carbon dioxide alone. Difluoromethane thus lowers the freezing point of the refrigerant mixture significantly, a certain mass fraction of carbon dioxide being required in order for the refrigerant mixture to be nonflammable. At the same time, however, difluoromethane leads to a high final compression temperature, which is why difluoromethane is suitable only within limits as a sole mixing partner for carbon dioxide. Pentafluoroethane cannot lower a freezing point of the refrigerant mixture as far as difluoromethane, but has a greater flame-retardant effect than carbon dioxide, which is advantageous.

Particularly advantageously, the cooling device is operated exclusively below the critical point of the refrigerant. If the cooling device is operated below the triple point of the refrigerant, reaching of a supercritical state of the refrigerant can be precluded. Thus, the cooling device does not have to be configured for operation in the supercritical state, which saves costs for production of the cooling device.

The test chamber according to the disclosure for conditioning air comprises a test space which serves to receive test material and which can be sealed against an environment and is temperature-insulated, and a temperature control device for controlling the temperature of the test space, a temperature in a temperature range of at least −20° C. to +180° C. being establishable within the test space by means of the temperature control device, the temperature control device having a cooling device comprising a cooling circuit with a refrigerant according to the disclosure a heat exchanger, a compressor, a condenser and an expansion element, the cooling circuit having an internal heat exchanger, the internal heat exchanger being connected to a high-pressure side of the cooling circuit upstream of the expansion element and downstream of the condenser and to a low-pressure side of the cooling circuit upstream of the compressor and downstream of the heat exchanger, wherein the refrigerant is a zeotropic refrigerant, the refrigerant of the high-pressure side being coolable by the refrigerant of the low-pressure side at constant suction pressure on the low-pressure side by means of the internal heat exchanger. Regarding the advantages of the test chamber according to the disclosure, reference is made to the description of advantages of the method according to the disclosure.

In particular, the constant suction pressure may also be maintained during lowering of the evaporation temperature of the refrigerant of the high-pressure side by means of the internal heat exchanger. Accordingly, the cooling of the refrigerant of the high-pressure side via the internal heat exchanger can also be exploited in part or exclusively to lower an evaporation temperature of the refrigerant at the expansion element. In principle, the suction pressure may also be set dynamically if a temperature constant for a longer period of time is to be established in the test space. In that case, too, the internal heat exchanger primarily serves to lower the evaporation temperature of the refrigerant irrespective of the suction pressure resulting from the temperature in the test space.

A dew point temperature of the refrigerant may be higher than a minimum temperature of the temperature range. In the test chambers known from the state of the art, the minimum temperature of the temperature range can no longer be established with a refrigerant of this kind in that case, but a comparatively higher minimum temperature, which substantially corresponds to the dew point temperature of the refrigerant. In the test chamber according to the disclosure, however, a refrigerant whose dew point temperature is higher than an achievable minimum temperature of the temperature range can be used because the liquefied refrigerant on the high-pressure side can be cooled by means of the internal heat exchanger, which means that an evaporation temperature of the refrigerant at the expansion element can be comparatively lower.

The heat exchanger may be dimensioned in such a manner that only part of the refrigerant can evaporate in the heat exchanger. This results in the advantage that the dew point or the location of the dew point temperature of the refrigerant can be shifted out of the heat exchanger into the internal heat exchanger. Because of a temperature glide of the zeotropic refrigerant, partial evaporation of the refrigerant in the heat exchanger achieves a lower temperature in the heat exchanger than the following remaining evaporation of the refrigerant in the internal heat exchanger.

In one embodiment of the test chamber, the heat exchanger may be disposed in the test space. In this case, the heat exchanger may also be disposed in an air treatment space of the test space so that air circulated by a fan can come into contact with a heat exchanger. In this way, a circulated amount of air of the test space can be cooled directly in the test space by means of the cooling device via the heat exchanger. The test chamber may have the cooling circuit as a sole, single cooling circuit. In this case, the cooling circuit is connected directly to the test space.

In another embodiment of the test chamber, the condenser may be realized as a cascade heat exchanger of another cooling circuit of the cooling device. Accordingly, the test chamber may have at least two cooling circuits, in which case the cooling circuit may form a second stage of the cooling device and another cooling circuit, which is disposed upstream of the cooling circuit, may form a first stage of the cooling device. In this case, the condenser serves as a cascade heat exchanger or a heat exchanger for the cooling circuit. This embodiment of a test chamber allows particularly low temperatures to be established in the test space.

The temperature control device may have a heating device comprising a heater and a heating heat exchanger in the test space. The heating device may be an electric resistance heater which heats the heating heat exchanger in such a manner that the temperature in the test space can be raised by means of the heating heat exchanger. If the heat exchanger and the heating heat exchanger can be specifically controlled by means of a control device to cool or heat the air circulated in the test space, a temperature in the temperature range indicated above can be established within the test space by means of the temperature control device. A temperature stability over time of ±1 K, preferably ±0.3 K to ±0.5 K or less than ±0.3 K, may be established in the test space during a test interval irrespective of the test material or of an operating state of the test material. A test interval is a segment of a full test period in which the test material is exposed to a substantially constant temperature or climatic condition. The heating heat exchanger may be combined with the heat exchanger of the cooling circuit in such a manner that a shared heat exchanger body through which the refrigerant can flow and which has heating elements of an electric resistance heater can be realized. The condenser may be cooled with air, water or another coolant. In principle, the condenser can be cooled using any suitable fluid. The essential aspect is that the thermal load generated at the condenser is discharged via the cooling air or the cooling water in such a manner that the refrigerant can condense until it is completely liquefied.

A first bypass having at least one controllable second expansion element may be realized in the cooling circuit, in which case the first bypass may be connected to the cooling circuit upstream of the internal heat exchanger and downstream of the condenser and the first bypass may be realized as a controllable additional internal cooling system. The first bypass may thus form a re-injection device for refrigerant. Accordingly, refrigerant can be recycled from the controllable second expansion element in the internal heat exchanger on the low-pressure side. In this case, the first bypass may be connected to the low-pressure side of the cooling circuit upstream of the internal heat exchanger and downstream of the heat exchanger. The refrigerant cooled or having its temperature level lowered by the second expansion element may be led through the internal heat exchanger and intensify cooling of the refrigerant on the high-pressure side of the internal heat exchanger. Also, a cooling capacity of the internal heat exchanger can be controlled even more precisely in this way.

A second bypass comprising at least one third expansion element may be formed in the cooling circuit, in which case the second bypass bypasses the expansion element downstream of the condenser and upstream of the internal heat exchanger and the refrigerant can be metered by means of the third expansion element in such a manner that a suction gas temperature and/or a suction gas pressure of the refrigerant can be controlled upstream of the compressor on the low-pressure side of the cooling circuit. In this way, potential overheating and damage of the compressor, which may be a compressor device, for example, can be prevented among other things. Consequently, gaseous refrigerant located upstream of the compressor can be cooled via the second bypass by actuation of the third expansion element by adding still-liquid refrigerant. The third expansion element can be actuated by means of a control device which itself is coupled to a pressure and/or temperature sensor in a cooling circuit upstream of the compressor. Particularly advantageously, overheating of the suction gas of 2 K to 60 K with respect to a suction gas temperature can be set via the second bypass. Also, the refrigerant can be metered in such a manner that an operating time of the compressor can be controlled. On principle, it is disadvantageous for the compressor or compressor device to be switched on and off repeatedly. A service life of a compressor can be prolonged if the compressor operates for longer periods of time. A refrigerant can be led past the expansion element or the condenser via the second bypass in order to delay an automated deactivation of the compressor and to prolong an operating time of the compressor, for example.

Another bypass comprising at least one other expansion element may be formed in the cooling circuit, the other bypass bypassing the compressor downstream of the compressor and upstream of the condenser in such a manner that a suction gas temperature and/or a suction gas pressure of the refrigerant can be controlled upstream of the compressor on the low-pressure side of the cooling circuit and/or that a pressure difference between the high-pressure side and a low-pressure side of the cooling circuit can be equalized. The second bypass may additionally be equipped with a settable or controllable valve, such as a magnetic valve. Connecting the high-pressure side and the low-pressure side via the other expansion element ensures that the gaseous refrigerant thus compressed gradually flows from the high-pressure side to the low-pressure side of the cooling circuit in the event of a system standstill. This also ensures gradual pressure equalization between the high-pressure side and the low-pressure side even when the expansion element is closed. A cross-section of the other expansion element may be dimensioned in such a manner that the refrigerant flowing from the high-pressure side to the low-pressure side has only a marginal impact on the normal operation of the cooling device. At the same time, a gaseous refrigerant located upstream of the compressor may be cooled by adding the liquid refrigerant via the other bypass.

Furthermore, the internal heat exchanger may be realized as a sub-cooling section or a heat exchanger, in particular a plate heat exchanger. The sub-cooling section may simply be realized by two line sections of the cooling circuit that are in contact with each other.

The expansion element may have a throttle and a magnetic valve, in which case refrigerant can be metered via the throttle and the magnetic valve. The throttle may be a settable valve or a capillary via which refrigerant is routed by means of the magnetic valve. The magnetic valve itself may be actuated by means of a control device.

Also, the temperature control device may comprise a control device comprising at least one pressure sensor and/or at least one temperature sensor in the cooling circuit, in which case a magnetic valve can be actuated by means of the control device as a function of a measured temperature and/or pressure. The control device may comprise means for data processing which process sets of data from sensors and control the magnetic valves. In this case, a function of the cooling device may also be adjusted to the refrigerant used via an appropriate computer program, for example. Furthermore, the control device may signal a malfunction and initiate a shut-down of the test chamber, if necessary, in order to protect the test chamber and the test material from damage due to critical or undesirable operating states of the test chamber.

Other embodiments of a test chamber are apparent from the description of features of the claims depending on method claim 1.

Hereinafter, preferred embodiments of the disclosure will be explained in more detail with reference to the accompanying drawings.

Figure 2:
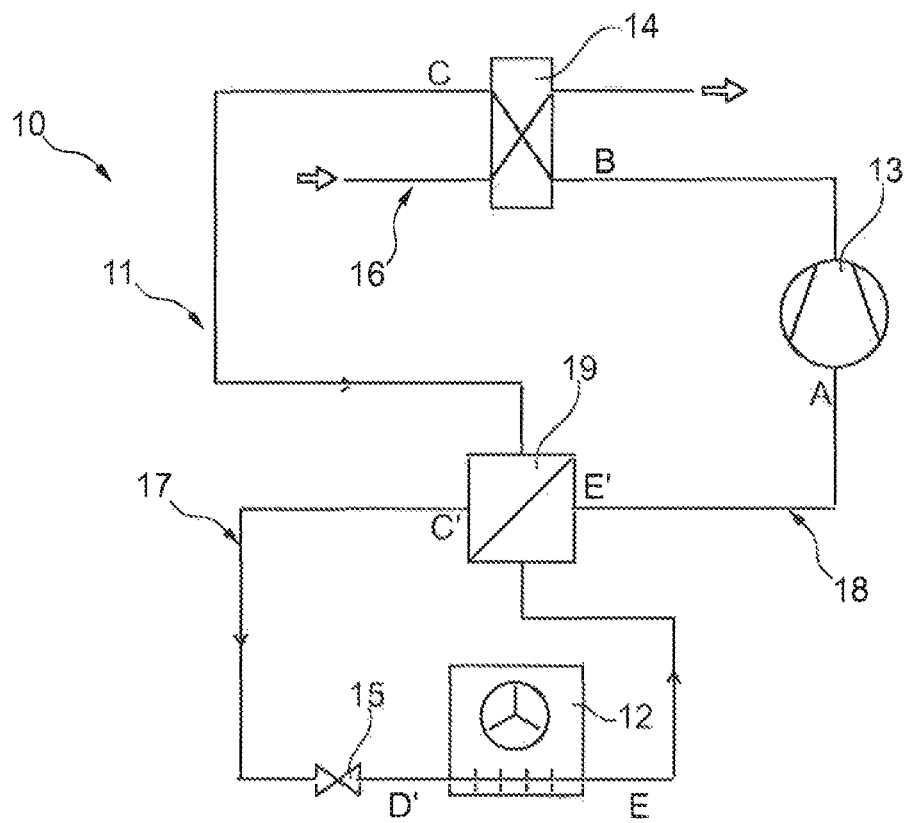
FIG. 2 is a schematic illustration of a first embodiment of a cooling device.

FIG. 2 shows a first embodiment of a cooling device 10 of a test chamber (not shown). Cooling device 10 comprises a cooling circuit 11 with a refrigerant, a heat exchanger 12, a compressor 13, a condenser 14 and an expansion element 15. Condenser 14 is cooled by another cooling circuit 16 in the case at hand. Heat exchanger 12 is disposed in a test space (not shown) of the test chamber. Furthermore, cooling circuit 11 has a high-pressure side 17 and a low-pressure side 18, to which an internal heat exchanger 19 is connected.

Figure 1:
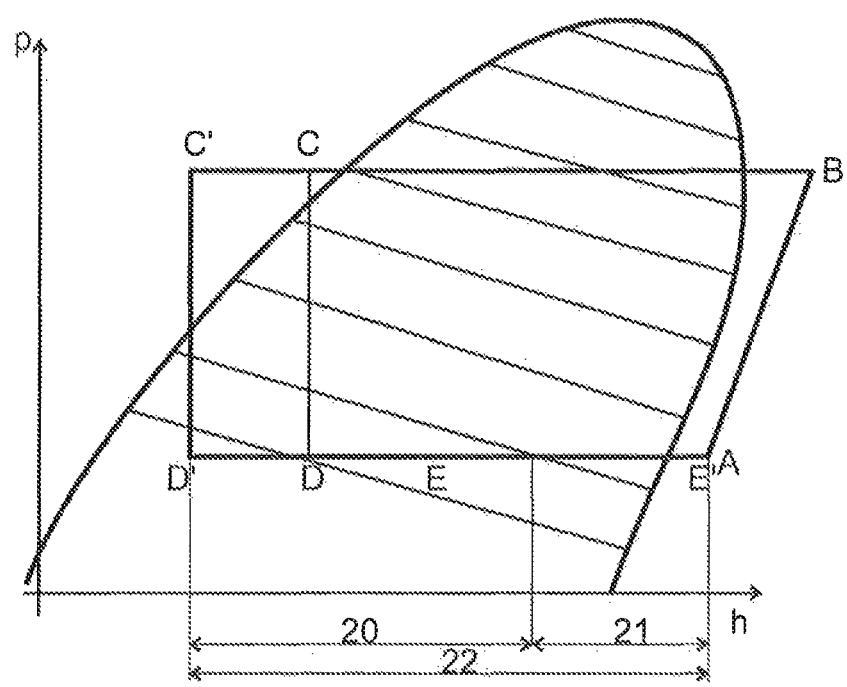
FIG. 1 is a pressure-enthalpy diagram for a refrigerant.

FIG. 1 shows a pressure-enthalpy diagram (log p/h diagram) for the refrigerant circulating in cooling circuit 11, the refrigerant being a zeotropic refrigerant. According to a combined view of FIGS. 1 and 2, starting from position A, the refrigerant upstream of compressor 13 is aspirated and compressed, whereby a pressure is achieved downstream of compressor 13 according to position B. The refrigerant is compressed by means of compressor 13 and is subsequently liquefied in condenser 14 according to position C. The refrigerant passes through internal heat exchanger 19 on high-pressure side 17, where it is cooled further, position C' upstream of expansion element 15 thus being reached. By means of internal heat exchanger 19, the portion of the wet vapor area (positons E to E') not usable in heat exchanger 12 can be used to further reduce a temperature of the refrigerant (positions C' to C). At expansion element 15, the refrigerant is relaxed (positions C' to D') and partially liquefied in heat exchanger 12 (positions D' to E). Then, the wet vapor of the refrigerant enters internal heat exchanger 19 on low-pressure side 18, where the refrigerant is re-evaporated until the dew-point temperature or the dew point of the refrigerant is reached at position E'. Hence, a first subsection 20 of an evaporation section 22 of the refrigerant runs through heat exchanger 12, a second subsection 21 of evaporation section 22 running through internal heat exchanger 19. The essential aspect is that a suction pressure of compressor 13 on low-pressure side 18 is kept constant on evaporation section 22 even if the evaporation temperature at expansion element 15 changes.

Figure 3:
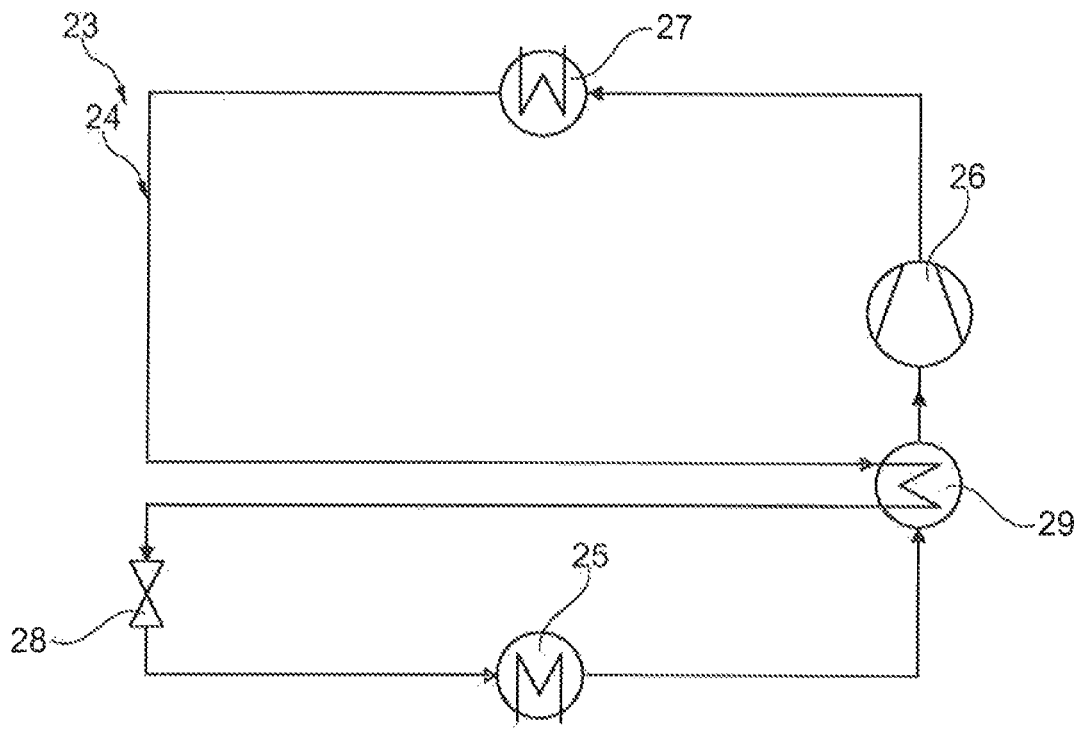
FIG. 3 is a schematic illustration of a second embodiment of a cooling device.

FIG. 3 shows a schematic illustration of a simplest embodiment of a cooling device 23, cooling device 23 being self-controlling. Cooling device 23 comprises a cooling circuit 24 with a heat exchanger 25, a compressor 26, a condenser 27, an expansion element 28 and an internal heat exchanger 29. Depending on a temperature at heat exchanger 25, refrigerant not fully evaporated escapes from heat exchanger 25 because the temperature at heat exchanger 25 or in a test space (not shown) is no longer high enough to cause a phase transition. In this case, refrigerant still liquid is re-evaporated in internal heat exchanger 29 because a temperature difference there has to be greater than at heat exchanger 25 at all times. Once the temperature of the liquid refrigerant upstream of expansion element 28 has been reduced by heat exchange in internal heat exchanger 29, the energy density and the temperature difference achievable with it at heat exchanger 25 increase. Cooling device 23 does not require elaborate control by way of sensors etc.

Figure 4:
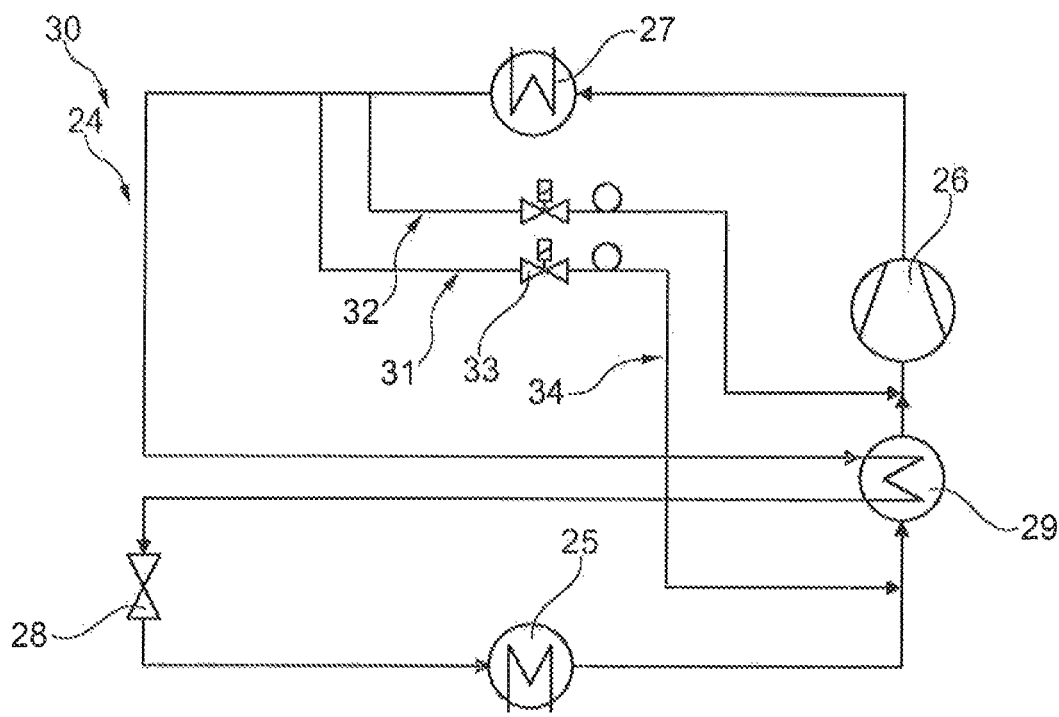
FIG. 4 is a schematic illustration of a third embodiment of a cooling device.

FIG. 4 shows a cooling device 30 which differs from the cooling device of FIG. 3 in that it has a first bypass 31 and a second bypass 32. A controllable second expansion element 33 is disposed in first bypass 31, first bypass 31 being configured as an additional internal cooling system 34. First bypass 31 is connected to cooling circuit 24 immediately downstream of condenser 27 upstream of internal heat exchanger 29 and downstream of heat exchanger 25 and upstream of internal heat exchanger 29. First bypass 31 thus bypasses expansion element 28 with heat exchanger 25, internal heat exchanger 29 being suppliable with evaporating refrigerant via second expansion element 33. A suction gas mass flow introduced into internal heat exchanger 29 can be cooled additionally by means of first bypass 31 in case of high suction gas temperatures, which may be caused by heat exchanger 25. In this way, evaporation of refrigerant upstream of the expansion element can be precluded. Hence, first bypass 31 can be used to react to changing load cases of cooling device 30. Second bypass 32 has a third expansion element 35 and is connected to cooling circuit 24 downstream of condenser 27 and upstream of internal heat exchanger 29 and downstream of internal heat exchanger 29 and upstream of compressor 26. This allows a suction gas mass flow upstream of compressor 26 to be reduced far enough via second bypass 32 to avoid inadmissibly high final compression temperatures.

Figure 5:
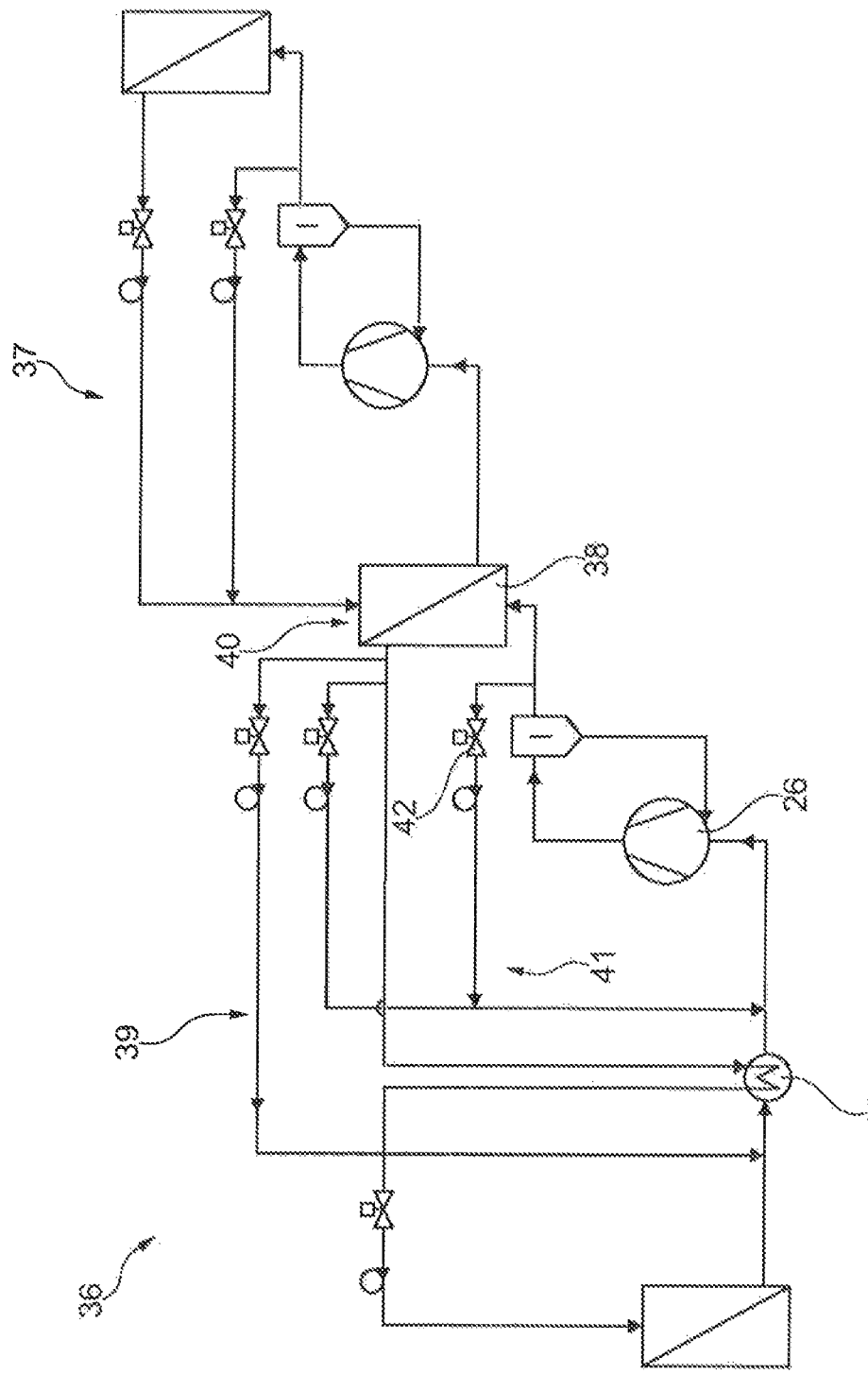
FIG. 5 is a schematic illustration of a fourth embodiment of a cooling device.

FIG. 5 shows a cooling device 36 which differs from the cooling device of FIG. 4 in that it has another cooling circuit 37. Other cooling circuit 37 serves to cool a condenser 38 of a cooling circuit 39. Condenser 38 is realized as a cascade heat exchanger 40 in the case at hand. Furthermore, cooling circuit 39 has another bypass 41 having another expansion element 42. Other bypass 41 is connected to cooling circuit 39 downstream of compressor 26 and upstream of condenser 38 and downstream of internal heat exchanger 29 and upstream of compressor 26. Thus, refrigerant not yet liquefied but compressed can flow back to upstream of compressor 26 via other bypass 41, whereby a suction gas temperature and/or a suction gas pressure of the refrigerant can be controlled.

Figure 6:
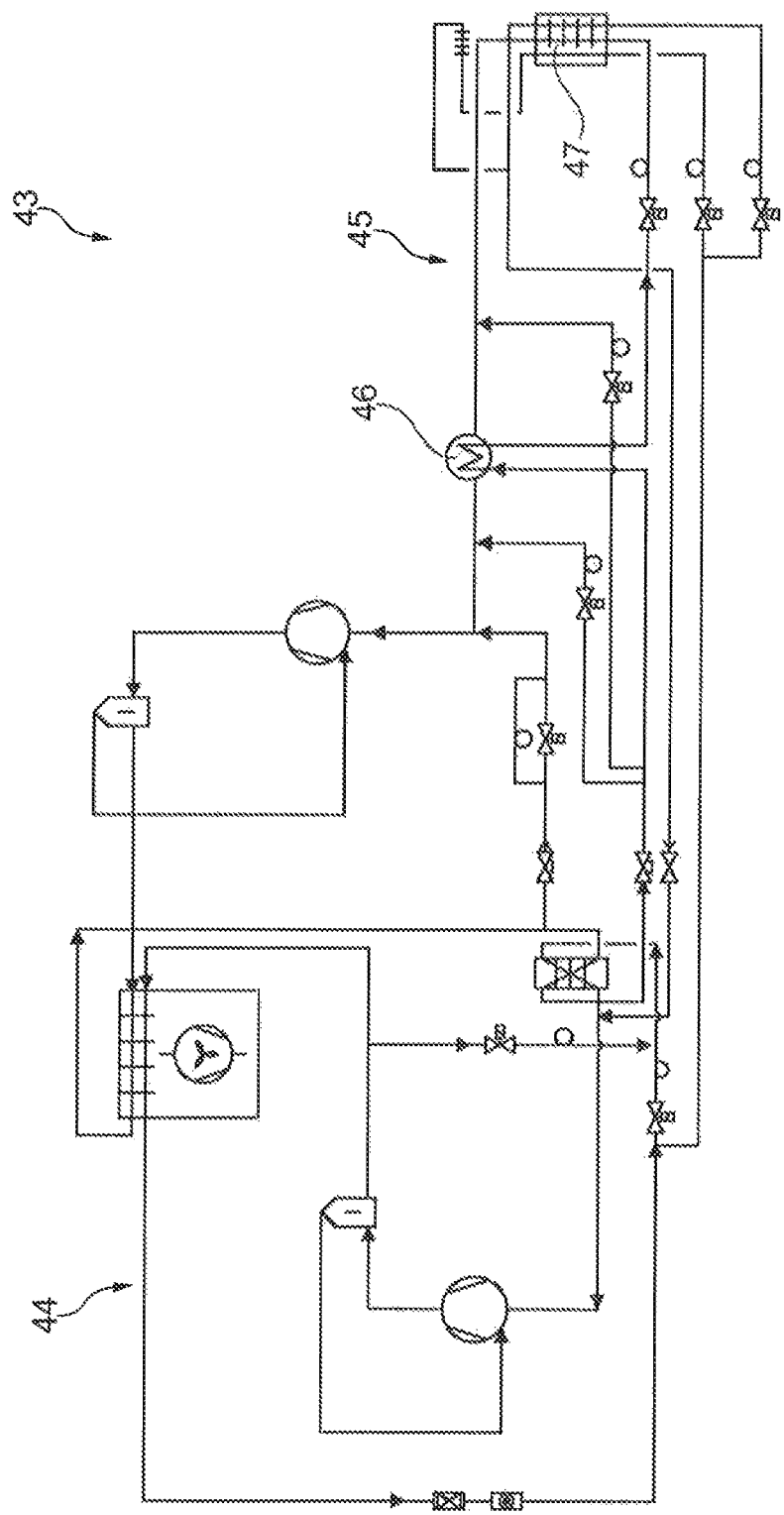
FIG. 6 is a schematic illustration of a fifth embodiment of a cooling device.

FIG. 6 shows a cooling device 30 having a cooling circuit 44 and another cooling circuit 45 and, in particular, an internal heat exchanger 46 in cooling circuit 44. In the case at hand, a heat exchanger 47 is disposed in a temperature-insulated test space of a test chamber (not shown).

The invention claimed is:

1. A method for conditioning air in a test space of a test chamber which serves to receive test material and which can be sealed against an environment and is temperature-insulated, a temperature in a temperature range of −20° C. to +180° C. being established within the test space by a cooling device of a temperature control device of the test chamber, the cooling device comprising a cooling circuit with a refrigerant, a heat exchanger, a compressor, a condenser and an expansion element, an internal heat exchanger of the cooling circuit connected to a high-pressure side of the cooling circuit upstream of the expansion element and downstream of the condenser and to a low-pressure side of the cooling circuit upstream of the compressor and downstream of the heat exchanger being used to cool the refrigerant of the high-pressure side,
wherein
a zeotropic refrigerant is used as the refrigerant, cooling of the refrigerant of the high-pressure side by means of the internal heat exchanger being used to lower an evaporation temperature at the expansion element, and wherein a suction pressure of the refrigerant of the low-pressure side is kept constant while the evaporation temperature of the refrigerant of the high-pressure side is being lowered.

2. The method according to claim 1, wherein the refrigerant evaporates at constant suction pressure on an evaporation section of the cooling circuit from the expansion element up to and including the internal heat exchanger.

3. The method according to claim 1, wherein a first portion of the refrigerant routed via the expansion element is evaporated in the heat exchanger and a second portion of the refrigerant is evaporated in the internal heat exchanger.

4. The method according to claim 1, wherein the evaporation temperature of the refrigerant of the high-pressure side is lowered in a self-controlled manner.

5. The method according to claim 1, wherein the temperature control device is used to lower a temperature of $>+60°$ C. to $+180°$ C. to a temperature of $\leq-20°$ C. in the test space.

6. The method according to claim 1, wherein the temperature control device is used to establish a temperature in a temperature range of $-57°$ C. to $+180°$ C. in the test space.

7. The method according to claim 1, wherein a refrigerant having a temperature glide of $\geq 5$ K is used.

8. The method according to claim 1, wherein the refrigerant is evaporated at a suction pressure in a pressure range of 0.3 to 5 bar absolute.

9. The method according to claim 1, wherein the refrigerant is condensed at a condensation pressure in a pressure range of 5 to 35 bar absolute.

10. The method according to claim 1, wherein a nonflammable refrigerant having a relative $CO_2$ equivalent of <2500 over 20 years is used.

11. A method for conditioning air in a test space of a test chamber which serves to receive test material and which can be sealed against an environment and is temperature-insulated, a temperature in a temperature range of −20° C. to +180° C. being established within the test space by a cooling device of a temperature control device of the test chamber, the cooling device comprising a cooling circuit with a refrigerant, a heat exchanger, a compressor, a condenser and an expansion element, an internal heat exchanger of the cooling circuit connected to a high-pressure side of the cooling circuit upstream of the expansion element and downstream of the condenser and to a low-pressure side of the cooling circuit upstream of the compressor and downstream of the heat exchanger being used to cool the refrigerant of the high-pressure side,
wherein
a zeotropic refrigerant is used as the refrigerant, cooling of the refrigerant of the high-pressure side by means of the internal heat exchanger being used to lower an evaporation temperature at the expansion element and wherein a refrigerant mixture composed of a mass fraction of carbon dioxide ($CO_2$) of 30 to 50 mass percent and a mass fraction of at least one other component is used as the refrigerant, the other component being pentafluoroethane ($C_2HF_5$) and/or difluoromethane ($CH_2F_2$).

12. A method for conditioning air in a test space of a test chamber which serves to receive test material and which can be sealed against an environment and is temperature-insulated, a temperature in a temperature range of −20° C. to +180° C. being established within the test space by a cooling device of a temperature control device of the test chamber, the cooling device comprising a cooling circuit with a refrigerant, a heat exchanger, a compressor, a condenser and an expansion element, an internal heat exchanger of the cooling circuit connected to a high-pressure side of the cooling circuit upstream of the expansion element and downstream of the condenser and to a low-pressure side of the cooling circuit upstream of the compressor and downstream of the heat exchanger being used to cool the refrigerant of the high-pressure side,
wherein
a zeotropic refrigerant is used as the refrigerant, cooling of the refrigerant of the high-pressure side by means of the internal heat exchanger being used to lower an evaporation temperature at the expansion element and wherein the cooling device is operated exclusively below the critical point of the refrigerant.

13. A test chamber for conditioning air, the test chamber comprising a test space which serves to receive test material and which can be sealed against an environment and is temperature-insulated, and a temperature control device for controlling the temperature of the test space, a temperature in a temperature range of −20° C. to +180° C. being establishable within the test space by the temperature control device, the temperature control device having a cooling device comprising a cooling circuit with a refrigerant, a heat exchanger, a compressor, a condenser and an expansion element, the cooling circuit having an internal heat exchanger, the internal heat exchanger being connected to a high-pressure side of the cooling circuit upstream of the expansion element and downstream of the condenser and to a low-pressure side of the cooling circuit upstream of the compressor and downstream of the heat exchanger,
wherein
the refrigerant is a zeotropic refrigerant, the refrigerant of the high-pressure side being coolable by the refrigerant of the low-pressure side at constant suction pressure on the low-pressure side by means of the internal heat exchanger and wherein a dew point temperature of the refrigerant is greater than a minimum temperature of the temperature range.

14. The test chamber according to claim 13, wherein the heat exchanger is of such a size that the refrigerant can only partially evaporate in the heat exchanger.

15. The test chamber according to claim 13, wherein the condenser is realized as a cascade heat exchanger of another cooling circuit of the cooling device.

16. The test chamber according to claim 13, wherein the temperature control device has a heating device comprising a heater and a heating heat exchanger in the test space.

17. The test chamber according to claim 13, wherein a first bypass having at least one controllable second expansion element is realized in the cooling circuit, the first bypass being connected to the cooling circuit upstream of the internal heat exchanger and downstream of the condenser, the first bypass being realized as an additional controllable internal cooling.

18. The test chamber according to claim 13, wherein another bypass having at least one other expansion element is realized in the cooling circuit, the other bypass bypassing the compressor downstream of the compressor and upstream of the condenser in such a manner that a suction gas temperature and/or a suction gas pressure of the refrigerant on the low-pressure side of the cooling circuit can be controlled upstream of the compressor and/or that a pressure difference between the high-pressure side and the low-pressure side of the cooling circuit can be equalized.

19. A test chamber for conditioning air, the test chamber comprising a test space which serves to receive test material and which can be sealed against an environment and is temperature-insulated, and a temperature control device for controlling the temperature of the test space, a temperature in a temperature range of −20° C. to +180° C. being establishable within the test space by the temperature control device, the temperature control device having a cooling device comprising a cooling circuit with a refrigerant, a heat exchanger, a compressor, a condenser and an expansion element, the cooling circuit having an internal heat exchanger, the internal heat exchanger being connected to a high-pressure side of the cooling circuit upstream of the expansion element and downstream of the condenser and to a low-pressure side of the cooling circuit upstream of the compressor and downstream of the heat exchanger,
wherein
the refrigerant is a zeotropic refrigerant, the refrigerant of the high-pressure side being coolable by the refrigerant of the low-pressure side at constant suction pressure on the low-pressure side by means of the internal heat exchanger and wherein a second bypass having at least one third expansion element is realized in the cooling circuit, the second bypass bypassing the expansion element downstream of the condenser and upstream of the internal heat exchanger, refrigerant being meterable by means of the third expansion element in such a manner that a suction gas temperature and/or a suction gas pressure of the refrigerant is controllable on the low-pressure side of the cooling circuit upstream of the compressor.

* * * * *